United States Patent
O'Harra

[15] 3,685,204
[45] Aug. 22, 1972

[54] DECORATIVE PLANT TOTEM

[72] Inventor: Russell L. O'Harra, 531 41st St., Des Moines, Iowa 50312

[22] Filed: Oct. 5, 1970

[21] Appl. No.: 72,923

[52] U.S. Cl..................................47/47, 47/34.12
[51] Int. Cl. .............................................A01g 17/14
[58] Field of Search.........................47/44–47, 48.5, 47/38, 34.12; 248/156

[56] References Cited

UNITED STATES PATENTS

| | | | |
|---|---|---|---|
| 3,188,771 | 6/1965 | Ballai | 47/47 |
| 2,964,877 | 12/1960 | Gauding | 47/38 |
| 3,142,935 | 8/1964 | Campos | 47/48.5 |
| 3,345,774 | 10/1967 | Delbuguet | 47/48.5 |
| 3,066,447 | 12/1962 | Reiterer et al. | 47/47 |
| 3,057,093 | 10/1962 | Gallo | 47/47 X |
| 2,893,169 | 7/1959 | Shepherd | 47/47 |
| 3,063,196 | 11/1962 | Pauer | 47/34.12 |
| 3,334,440 | 8/1967 | Choquette | 47/35 |

FOREIGN PATENTS OR APPLICATIONS

| | | | |
|---|---|---|---|
| 116,761 | 9/1926 | Switzerland | 47/44 |

*Primary Examiner*—Robert E. Bagwill
*Attorney*—Zarley, McKee & Thomte

[57] ABSTRACT

A support for vining house plants including a base section having frangible leg portions disposed in a pot and one or more upstanding hollow totem sections with perforated exterior walls to allow the roots on the stems of the plant to penetrate through the perforations and receive nourishment from water and soluble plant food stored in the totem unit. As the plant grows taller additional totem sections may be added and a removable decorative cover is provided for the top end of the top section. The base section is a cross in cross section and provides maximum strength while occupying a minimum of space. The totem unit may have any desired design including an upstanding pole, a sphere or be shaped like a bird or animal. The sphere-shaped unit may include two semi-spherical members to provide access into the interior of the unit and also include an annular watering trough having openings in communication with the interior of the sphere.

Typically a fern totem is provided for growing house plants and eventually it will rot off in the soil in the pot thereby ruining the plant. This type of a support does not provide any moisture or nutrients for the plant to feed upon as it grows.

9 Claims, 6 Drawing Figures

PATENTED AUG 22 1972          3,685,204
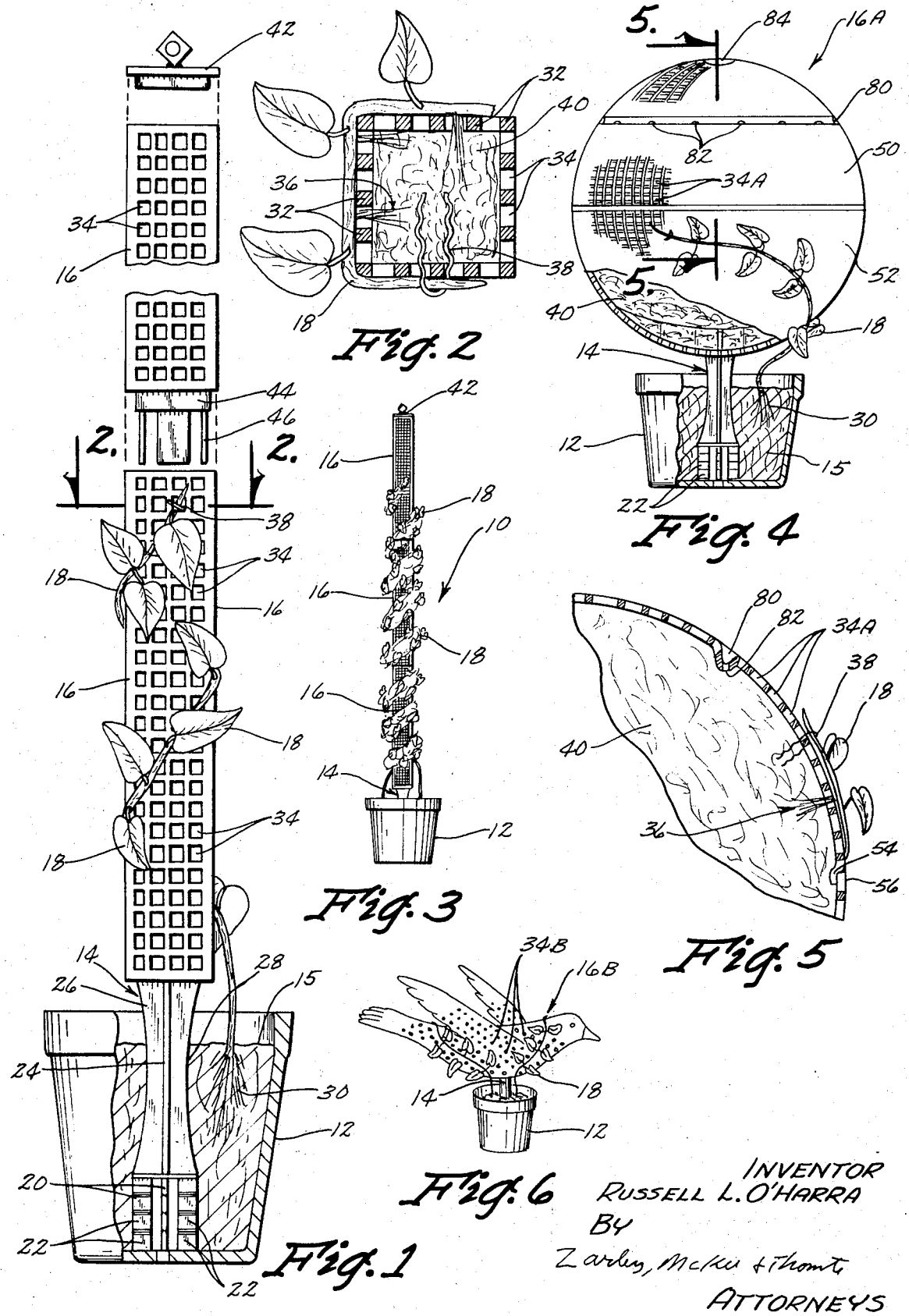
INVENTOR
RUSSELL L. O'HARRA
BY
Zarley, McKee & Thomte
ATTORNEYS

DECORATIVE PLANT TOTEM

The decorative plant totem of this invention may be conveniently used for typical house plants such as ivy and philodendron.

The totem includes a sturdy nonrotatable base of plastic or the like material set in the soil in the pot. A plurality of legs on the base unit may be cut to the desired length to give the desired height for the totem in the pot. The stems of the plant growing up the base of the totem are pinned against the totem with plastic clips that fit into design perforations in communication with the hollow interior of the totem. The roots that arise along the stems penetrate these openings or perforations and grow into a sphagnum core which may be kept moist by watering from the top as necessary. Additionally, the totem having an open top closable by a decorative cover may be filled with soluble plant food as needed to provide additional nourishment. Evaporation of moisture from the sphagnum moss raises the humidity around the leaves of the plant to create a more favorable growing environment.

The totems may be made in any desired color or shape and may be telescoped together to provide the required height for a given house plant.

This invention consists in the construction, arrangement and combination of the various parts of the device, whereby the objects contemplated are attained as hereinafter more fully set forth, specifically pointed out in the claims, and illustrated in the accompanying drawings in which:

FIG. 1 is a fragmentary exploded side elevational view of a two totem section decorative plant totem;

FIG. 2 is a cross sectional view taken along line 2 — 2 in Fig. 1;

FIG. 3 is a reduced in scale side elevational view of an assembled three totem section decorative plant totem;

FIG. 4 is a fragmentary side elevational view of an alternate embodiment of this invention wherein the totem section is spherical in shape;

FIG. 5 is a fragmentary cross sectional view taken along line 5 — 5 of FIG. 4; and FIG. 6 is a reduced in scale perspective view of a further alternate embodiment of a totem section in the shape of a bird.

The decorative plant totem of this invention is referred to in FIG. 3 generally by the reference numeral 10 and includes a pot 12 in which a base section 14 is placed in soil 15 and supports three telescopically engaged totem sections 16 which support a house plant 18.

The base unit 14 includes four legs 20 each of which are comprised of frangible portions 22 which may be broken off to give the desired height for the base 14 in the pot 12. The upper portion 24 of the base 14 is cross shaped in cross section and includes outwardly radiating elements 26 having a concave outwardly exterior edge 28 thereby providing a maximum of space around the base unit 14 while giving a maximum structural strength to the plant supporting totem 10. The roots or ball 30 of the plant 18 may grow into and around the base 14 and the legs 20.

As seen in FIGS. 1, 2 and 3, a rectangular in cross section totem is provided on the base unit 14 and includes four side walls 32 uniformly decoratively perforated with openings 34 through which plant stem roots 36 may extend along with plastic clips 38 thereby holding the plant vine 18 onto the totem and providing it with moisture and other nutrition from the moist sphagnum core 40 in the interior of the totem sections 16. The totem sections have an open upper end which is closable by a decorative cover 42 which when removed provides access into the interior of the totem sections 16 for watering and feeding purposes. Additionally, the desired height for a totem may be obtained by telescopically interconnecting the totem sections 16 since a bottom end of the totem sections other than the bottom totem section includes a downwardly extending continuous wall flange 44 from which downwardly extending legs 46 project into the interior of the adjacent lower totem section 16. The opposite end of the upper totem section is closed by the cover 42 which as the plant grows taller may be removed for an additional totem section 16 to be added which in turn will then receive at its top end the cover 42.

As seen in FIGS. 4 and 5 the totem section 16A is spherical in shape and includes top and bottom halves 50 and 52 respectively interconnected by overlapping peripheral flange portions 54 and 56 as seen in FIG. 5. The interior of the spherical totem section 16A is filled with sphagnum moss 40 or the like and roots 36 from the plant 18 extend through the openings 34A into the interior to hold the plant on the totem and provide it with moisture and nourishment. An annular shallow watering trough 80 is provided in the top semi-spherical section 50 and includes a series of spaced apart openings 82 in communication with the interior of the spherical totem 16A. Thus water may be poured into this trough to feed the plant and keep the sphagnum moss moist. An additional opening 84 is provided at the top of the top semi-spherical section 50 to provide additional watering access into the interior of the totem 16A.

In FIG. 6 a topiary totem 16B is illustrated in the shape of a bird and is mounted on a base 14 positioned in the pot 12. The outer surface of the totem unit 16B includes openings 34B for feeding roots of the plant 18. As with the other embodiments of the totem sections the openings 34B contribute to the decorative design of the totem. An appropriate opening may be provided in the bird shaped totem 16B to provide an access opening for filling the hollow interior with sphagnum moss or the like.

Thus it is seen in use that the nonrotatable material employed in the totem of this invention will allow the house plant to live a normal life and grow to its normal height by the addition of additional totem sections 16 when the totem unit 10 of FIGS. 1 - 3 is used. The nylon clips 38 may be used as needed to initially hold the plant to the exterior of the totem while the plant roots penetrate the openings 34 whereupon the plant will root itself to the totem. The plant may feed along its full length since moist, nutritious sphagnum moss or the like is at hand along the full length of the totem and not just in the pot holding the base unit. Depending on the size of the pot and the desire of the user, the frangible leg portions 22 may be broken away. The leg portions are spaced apart and will allow the dirt and roots to fill therebetween thereby enhancing the rooting system of the plant and improving the stability of the totem in the pot.

I claim:

1. A plant totem comprising,
a base section adapted to be positioned in a container,
an upstanding totem section operatively secured to said base section,
said totem section being spherical in shape and including a pair of interconnected semi-spherical sections and being at least partially hollow on the interior and having an exterior wall surface including openings in communication with the interior through which plant roots may extend to feed upon nutrients adapted to be placed in the interior of said totem section, and
a watering trough formed in the outer surface of said spherical totem adjacent its top and including openings communicating with the hollow interior.

2. A plant totem comprising,
a base section adapted to be positioned in a container,
said base section including a plurality of spaced apart downwardly extending supporting legs adapted to engage the bottom of a container, each of said legs including a plurality of vertically disposed frangible portions adapted to be selectively broken off to give the desired height for the base section in a container,
an upstanding totem section operatively secured to said base section, and
said totem section being at least partially hollow on the interior and having an exterior wall surface including openings in communication with the interior through which plant roots may extend to feed upon nutrients adapted to be placed in the interior of said totem section.

3. The structure of claim 2 wherein said totem member is substantially uniform in transverse cross section throughout its length.

4. The structure of claim 3 wherein said totem member is further defined as being rectangular in cross section and substantially hollow throughout its length thereby providing exterior walls with said openings in each of said walls.

5. The structure of claim 2 wherein the upper end of said totem includes a removable cover member over a top opening in communication with said hollow interior.

6. The structure of claim 5 wherein said totem member includes a plurality of detachable totem sections with said cover member being on the top end of said top section.

7. The structure of claim 6 wherein said top section includes connecting means telescopically received in the top open end of the adjacent lower section.

8. The structure of claim 2 wherein said plurality of supporting legs comprise a lower portion of said base section and an upstanding upper portion is provided which is cross shaped in cross section with outwardly radiating elements.

9. The structure of claim 8 wherein said outwardly radiating elements have a concave outwardly exterior edge thereby providing a maximum of space around the base unit.

* * * * *